United States Patent
Park et al.

(10) Patent No.: US 10,009,545 B2
(45) Date of Patent: Jun. 26, 2018

(54) IMAGE PROCESSING APPARATUS AND METHOD OF OPERATING THE SAME

(71) Applicant: Samsung Electronics Co., Ltd., Gyeonggi-do (KR)

(72) Inventors: Jong-hyon Park, Gyeonggi-do (KR); Yong-ju Lee, Gyeonggi-do (KR); Jun-hyuk Ko, Seoul (KR); Kyoung-joon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/218,860

(22) Filed: Jul. 25, 2016

(65) Prior Publication Data
US 2017/0026584 A1   Jan. 26, 2017

(30) Foreign Application Priority Data
Jul. 24, 2015 (KR) .................... 10-2015-0105303

(51) Int. Cl.
*H04N 5/232* (2006.01)

(52) U.S. Cl.
CPC ..... *H04N 5/23293* (2013.01); *H04N 5/23212* (2013.01); *H04N 5/23219* (2013.01)

(58) Field of Classification Search
CPC .......... H04N 5/23212; H04N 5/23219; H04N 5/23293; H04N 1/0044–1/00472; H04N 2201/0077; H04N 2201/0084
See application file for complete search history.

(56) References Cited

U.S. PATENT DOCUMENTS

| | | | | |
|---|---|---|---|---|
| 6,301,440 | B1* | 10/2001 | Bolle | ............. 348/229.1 |
| 2010/0332553 | A1* | 12/2010 | Choi | ....... G06F 17/30256 |
| | | | | 707/802 |
| 2012/0147220 | A1 | 6/2012 | Lee | |
| 2014/0071326 | A1 | 3/2014 | Jang et al. | |
| 2016/0277651 | A1* | 9/2016 | Sherman | ......... H04N 5/2259 |
| 2016/0277671 | A1* | 9/2016 | Smeyers | ....... H04N 5/23216 |

FOREIGN PATENT DOCUMENTS

| | | |
|---|---|---|
| JP | 2006-261711 | 9/2006 |
| JP | 2014-057310 | 3/2014 |
| JP | 2014-155208 | 8/2014 |
| KR | 10-2009-0077486 | 7/2009 |
| KR | 10-2010-0093955 | 8/2010 |
| KR | 10-2012-0065043 | 6/2012 |
| KR | 10-2014-0115729 | 10/2014 |

* cited by examiner

*Primary Examiner* — Paul Berardesca
(74) *Attorney, Agent, or Firm* — The Farrell Law Firm, P.C.

(57) ABSTRACT

An image processing apparatus and method are provided. The apparatus includes an image obtainer configured to obtain a captured image; a quick view image generator configured to generate a quick view image showing a region of the captured image based on a user profile determined according to a type of the captured image; and a display unit configured to display the generated quick view image according to a preset method.

17 Claims, 13 Drawing Sheets

IMAGE PROCESSING APPARATUS AND METHOD OF OPERATING THE SAME

PRIORITY

This application claims priority under 35 U.S.C. § 119(a) to Korean Patent Application No. 10-2015-0105303, which was filed in the Korean Intellectual Property Office on Jul. 24, 2015, the entire disclosure of which is incorporated herein by reference.

BACKGROUND

1. Field of the Disclosure

The present disclosure relates generally to image processing, and more particularly, to an image processing apparatus and method for generating quick view images.

2. Description of the Related Art

As technology for image processing apparatuses has advanced, image processing apparatuses for capturing or storing high-quality images have been developed.

When a captured image is stored in an image processing apparatus, a user must enlarge/reduce or move the captured image (e.g., vertically and/or horizontally) in order to check a portion of interest in the captured image. Also, when high-quality images each having a large size are stored, it takes a long time for an image processing apparatus to display all of the high-quality images on a screen.

SUMMARY

An aspect of the present disclosure is to provide methods and image processing apparatuses for generating quick view images.

In accordance with an aspect of the present disclosure, an image processing apparatus is provided. The image processing apparatus includes an image obtainer configured to obtain a captured image; a quick view image generator configured to generate a quick view image showing a region of the captured image based on a user profile determined according to a type of the captured image; and a display unit configured to display the generated quick view image according to a preset method.

According to another aspect of the present disclosure, an image processing method is provided. The image processing method includes obtaining a captured image; generating a quick view image showing a region of the captured image based on a user profile determined according to a type of the captured image; and displaying the generated quick view image according to a preset method.

According to another of the present disclosure, a computer-readable recording medium has embodied thereon a program for executing an image processing method. The image processing method includes obtaining a captured image; generating a quick view image showing a region of the captured image based on a user profile determined according to a type of the captured image; and displaying the generated quick view image according to a preset method.

BRIEF DESCRIPTION OF THE DRAWINGS

The above and other aspects, features, and advantages of certain embodiments of the present disclosure will become more apparent from the following description, when taken in conjunction with the accompanying drawings in which.

DETAILED DESCRIPTION OF EMBODIMENTS OF THE PRESENT DISCLOSURE

Figure 1:
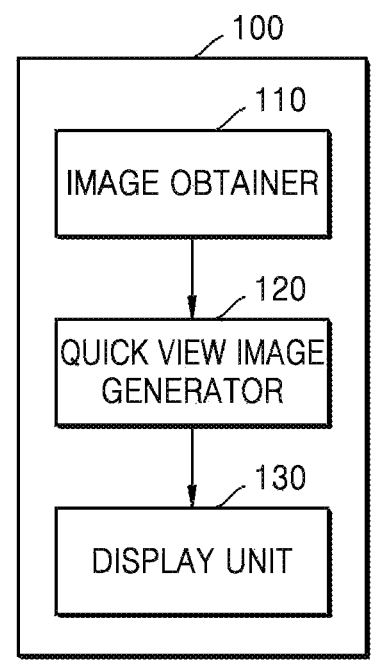
FIG. 1 is a block diagram of an image processing apparatus according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The terms used herein are selected from among common terms that are currently widely used in consideration of their functions with respect to embodiments of the present disclosure. However, the definitions of terms may vary according to usage by one of ordinary skill in the art, a precedent, or the advent of new technology. Also, in some cases, the meanings of terms are described in detail in the corresponding parts of the detailed description. Therefore, the terms used herein are defined based on the meaning of the terms and with respect to content throughout the descriptions of embodiments of the present disclosure.

Throughout the specification, when a portion of an item "includes" an element, another element may be further included in the item, without excluding the existence of other elements of the item, unless otherwise described. Also, the terms such as " . . . unit", "module", or the like used herein indicate a unit, which performs at least one function or motion, and the unit may be implemented as hardware or software, or as a combination of hardware and software.

Herein, when an element is referred to as being "connected" to another element, the element may be "directly connected" to the other element or "electrically connected" to the other element with intervening elements therebetween. When an item is referred to as "including" or "comprising" an element, unless otherwise defined, the item may further include other elements, without excluding the other elements of the item.

As used herein, the term "and/or" includes any and all combinations of one or more of the associated listed items. Expressions such as "at least one of," when preceding a list of elements, modify the entire list of elements and do not modify the individual elements of the list.

An image processing apparatus 100, 1100*a*, or 2000 throughout the specification may be implemented as any of various apparatuses, for example, a digital still camera for capturing a still image or a digital video camera for capturing a moving image. Also, examples of the image processing apparatus 100, 1100*a*, or 2000 may include a digital single-lens reflex camera (DSLR) and a mirrorless camera. Also, the image processing apparatus 100, 1100*a*, or 2000 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, and a wearable device. Also, examples of the image processing apparatus 100, 1100*a*, or 2000 according to an embodiment is not limited thereto, and may include any electronic apparatus on which a camera module that includes a lens and an imaging device and captures an image of a subject is mounted.

The term "quick view image", as used herein, may refer to a region of a captured image. According to an embodiment of the present disclosure, a quick view image may show a region, in which a user is interested, in an image captured by the image processing apparatus 100. According to another embodiment of the present disclosure, a quick view image may show a region of interest in an external image obtained by the image processing apparatus 100 from the outside. Accordingly, the user may determine whether to remove the captured image by checking the quick view image. The term "quick view image" may also refer to an image that is obtained by increasing a size of a region in a captured image.

FIG. 1 is a block diagram for explaining the image processing apparatus 100 according to an embodiment of the present disclosure.

According to an embodiment of the present disclosure, the image processing apparatus 100 includes an image obtainer 110, a quick view image generator 120, and a display unit 130. Only elements related to the present embodiment are illustrated in FIG. 1. Accordingly, it will be understood by one of ordinary skill in the art that general-purpose elements other than the elements illustrated in FIG. 1 may be further included in the image processing apparatus 100.

According to an embodiment of the present disclosure, the image obtainer 110 may obtain a captured image. The image obtainer 110 may directly photograph a subject and may obtain an image. The image obtainer 110 may obtain an image, which is captured by an external apparatus, from the external apparatus.

According to an embodiment of the present disclosure, the quick view image generator 120 may generate a quick view image showing a region of the captured image based on a user profile determined according to a type of the captured image. Also, the user profile may indicate which region of the captured image is to be shown by the quick view image, a size of the quick view image, the number of the quick view images, or whether to compress and store the quick view image. Also, examples of the type of the captured image may include, but are not limited to, a distant portrait photograph type, a group photograph type, a landscape photograph type, a sports activity photograph type, and a close-up photograph type. Also, the user profile may be set differently according to the type of the captured image. That is, the user profile may be set differently according to whether the type of the captured image is a distant portrait photograph type or a close-up portrait photograph type. Accordingly, the quick view image generator 120 may set different user profiles according to types of the captured image.

According to an embodiment of the present disclosure, the quick view image generator 120 may determine the user profile on which a previous usage pattern of the user is reflected. That is, the quick view image generator 120 may learn the previous usage pattern of the user and may determine which region of the captured image is to be shown by the quick view image and a size of the quick view image. The quick view image generator 120 may learn the previous usage pattern of the user by using machine learning. For example, when the user has frequently enlarged and checked a region where the user appears in the image captured by the image processing apparatus 100, the quick view image generator 120 may determine the user profile according to the region where the user appears and a ratio at which the user enlarges the image. Accordingly, the quick view image generator 120 may generate the region where the user appears in the captured image as a quick view image through the determined user profile. Also, the quick view image generator 120 may update the user profile as the usage pattern of the user changes.

Also, according to an embodiment of the present disclosure, the quick view image generator 120 may determine, in advance, the user profile based on an input of the user. That is, the quick view image generator 120 may determine, in advance, which region of the captured image is to be shown by the quick view image and a size of the quick view image based on the input of the user. Accordingly, the quick view image generator 120 may generate the quick view image according to the user profile that is determined in advance.

According to an embodiment of the present disclosure, the quick view image generator 120 may determine a type of the captured image. That is, the quick view image generator 120 may determine whether the type of the captured image is a distant portrait photograph type, a group photograph type, a landscape photograph type, a sports activity photograph type, or a close-up photograph type by analyzing the captured image. The quick view image generator 120 may determine the type of the captured image based on focus information and face recognition information of the captured image. For example, when a focus of the captured image is located at the rear of the captured image and a recognized face exists, the quick view image generator 120 may determine that the type of the captured image is a distant portrait photograph type. Accordingly, the quick view image generator 120 may generate the quick view image according to the user profile corresponding to the determined type. For example, according to the user profile corresponding to a group photograph type, the quick view image generator 120 may generate a plurality of recognized face regions in the captured image as a plurality of quick view images.

According to an embodiment of the present disclosure, the quick view image generator 120 may store the generated quick view image in an internal memory. Also, the quick view image generator 120 may temporarily store the generated quick view image in a quick view image buffer. Also, the quick view image generator 120 may compress the generated quick view image and may store the compressed quick view image in the quick view image buffer.

According to an embodiment of the present disclosure, the display unit 130 may display the generated quick view image according to a preset method. For example, the display unit 130 may enlarge the generated quick view image by a predetermined size and may display the enlarged quick view image on a screen of the image processing apparatus 100. Also, the display unit 130 may enlarge the generated quick view image by a predetermined size and may display the enlarged quick view image for a predetermined period of time. Also, the display unit 130 may enlarge a plurality of quick view images and respectively display the enlarged quick view images for preset periods of time. Also, the quick view image generator 120 may learn the previous usage pattern of the user and may determine a method of displaying the quick view image. Also, the display unit 130 may display the quick view image stored in the quick view image buffer. Accordingly, since the display unit 130 may read and display the quick view image stored in the quick view image buffer, the display unit 130 may display the quick view image faster than when reading and displaying the quick view image stored in the internal memory. Also, since the quick view image has a size smaller than that of an original image, the display unit 130 may reduce a time taken to display the quick view image to be shorter than a time taken to display the original image.

Figure 2:
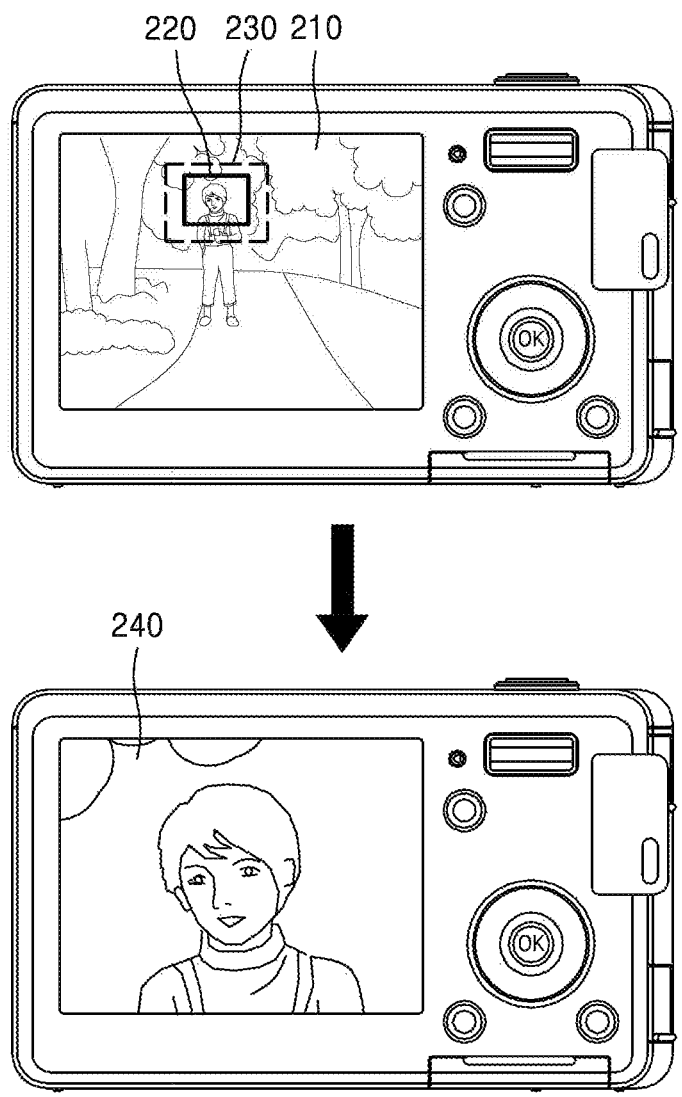
FIG. 2 is a diagram illustrating an example according to an embodiment of the present disclosure in which a captured image is a distant portrait photograph, the image processing apparatus generates a quick view image.

FIG. 2 is a diagram illustrating an example according to an embodiment of the present disclosure in which a captured image is a distant portrait photograph, the image processing apparatus generates a quick view image.

Referring to FIG. 2, according to an embodiment of the present disclosure, the image processing apparatus 100 may obtain a captured image 210 by imaging a subject. Next, the image processing apparatus 100 may determine a type of the captured image 210. That is, the image processing apparatus 100 may recognize that a focus of the captured image 210 is located at the rear and one recognized face region 220 exists based on focus information and face recognition information of the captured image 210, and may determine that the type of the captured image 210 is a distant portrait photograph type. The image processing apparatus 100 may obtain focus information of a lens in the image processing apparatus 100 and may obtain face recognition information from a face recognition module in the image processing apparatus 100. According to another embodiment of the present disclosure, the image processing apparatus 100 may determine that the type of the captured image 210 is a distant portrait photograph type according to a preset input of the user.

Next, the image processing apparatus 100 may generate a quick view image based on a user profile corresponding to the distant portrait photograph type. That is, when the type is a distant portrait photograph type, according to the user profile on which a tendency of the user to check a face region is reflected, the image processing apparatus 100 may crop a preset region (hereinafter referred to as a "cropped region") 230 including a face region 220 recognized in the captured image 210. Accordingly, the image processing apparatus 100 may generate the cropped region 230 as a quick view image. The image processing apparatus 100 may also generate an image 240 that is obtained by enlarging a part of the cropped region 230 as a quick view image. Also, according to another embodiment, the image processing apparatus 100 may determine a user profile by learning a usage pattern on which a tendency of the user to enlarge a whole body region of a person is reflected, and may generate a region including the whole body region of the person recognized in the captured image 210 as a quick view image according to the determined user profile.

Accordingly, the image processing apparatus 100 may display the image 240, which is a quick view image obtained by enlarging a part of the cropped region 230 according to a preset method. Also, the image processing apparatus 100 may alternately display the captured image 210 and the quick view image 240 according to another method. Also, the image processing apparatus 100 may perform a zoom-in operation to gradually enlarge the cropped region 230 in the captured image 210 according to another method.

Accordingly, when the user captures an image of a person by using the image processing apparatus 100, the user may directly check a region of interest of the person by using a quick view image displayed on the image processing apparatus 100 right after capturing the image without performing an additional zoom-in operation on the captured image in order to check the region of interest of the person.

Figure 3:
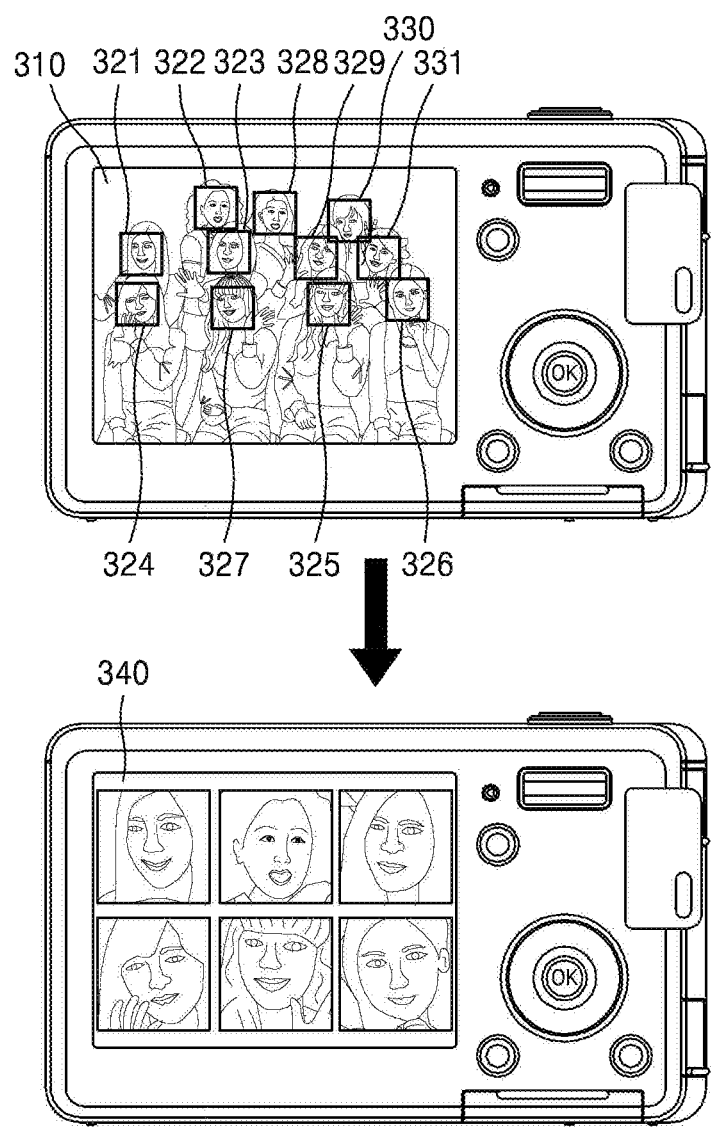
FIG. 3 is a diagram illustrating an example according to an embodiment of the present disclosure in which, when a captured image is a group photograph, the image processing apparatus generates a quick view image.

FIG. 3 is a diagram illustrating an example according to an embodiment of the present disclosure in which a captured image is a group photograph, the image processing apparatus 100 generates a quick view image.

Referring to FIG. 3, according to an embodiment of the present disclosure, the image processing apparatus 100 may obtain an image 310 by imaging a group of people. Next, the image processing apparatus 100 may determine a type of the captured image 310. That is, the image processing apparatus 100 may recognize that a focus of the captured image 310 is located at the rear and a plurality of recognized face regions 321 through 331 exist based on focus information and face recognition information of the captured image 310, and may determine that the type of the captured image 310 is a group photograph type. The image processing apparatus 100 may determine that the captured image 310 is a group photograph type according to a preset input of the user.

Next, the image processing apparatus 100 may generate a quick view image based on a user profile corresponding to the group photograph type. That is, when the type is the group photograph type, the image processing apparatus 100 may crop the face regions 321 through 331 recognized in the captured image 310 according to the user profile on which a tendency of the user to check a plurality of face regions is reflected. Accordingly, the image processing apparatus 100 may generate the plurality of cropped face regions 321 through 331 as a plurality of quick view images.

Accordingly, the image processing apparatus 100 may display the generated quick view images according to a preset method. According to an embodiment of the present disclosure, the image processing apparatus 100 may set the number of quick view images that may be displayed on one screen to six images according to an input of the user or a previous usage pattern of the user. Accordingly, the image processing apparatus 100 may display quick view images 340 corresponding to six face regions 321 through 326 on a screen. Next, as a predetermined period of time passes, the image processing apparatus 100 may display quick view images corresponding to remaining five face regions 327 through 331 on the screen. The image processing apparatus 100 may perform a zoom-in operation to sequentially enlarge the face regions 321 through 331 in the captured image 310. That is, the image processing apparatus 100 may perform a zoom-in operation to sequentially enlarge the face regions 321 through 331 in the captured image 310 in a preset order.

Figure 4:
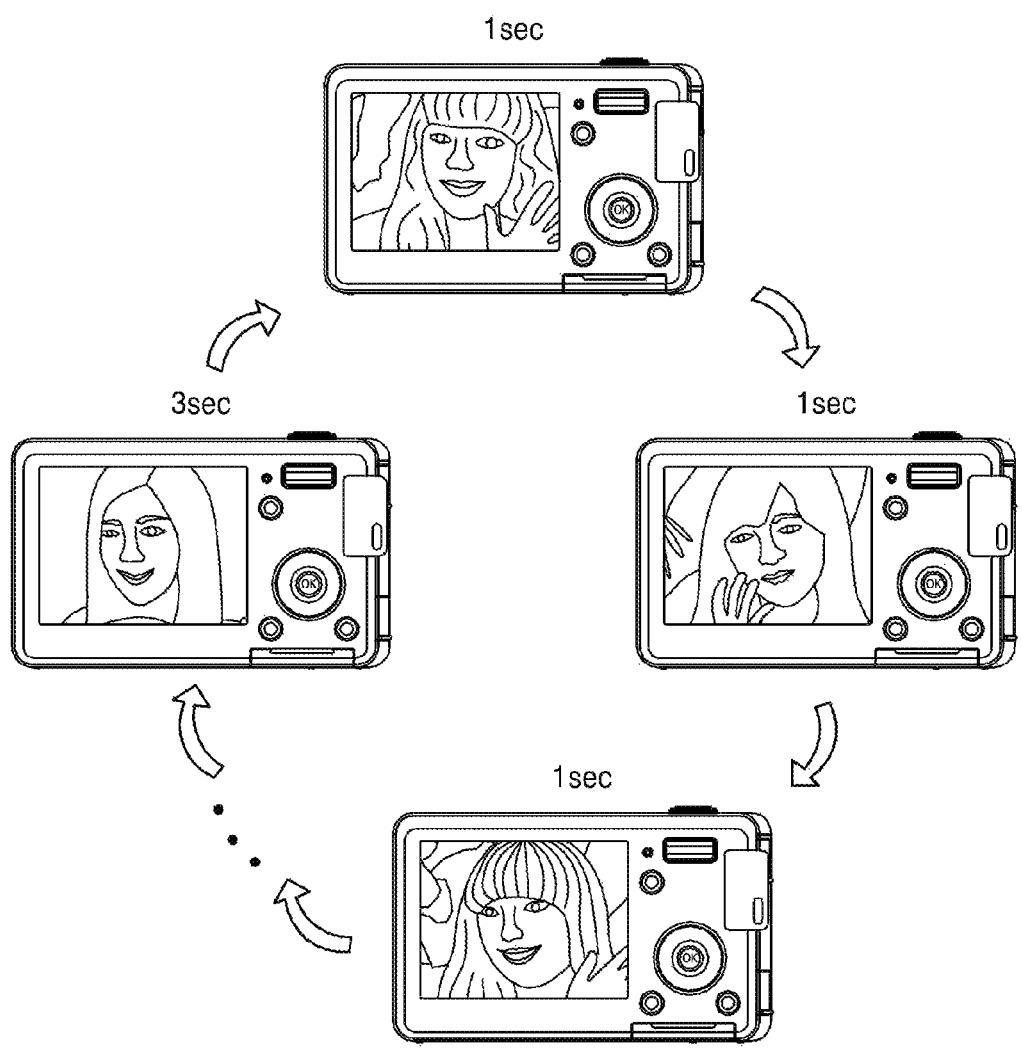
FIG. 4 is a diagram illustrating an example according to another embodiment of the present disclosure in which the image processing apparatus displays a plurality of quick view images.

FIG. 4 is a diagram illustrating an example according to another embodiment of the present disclosure in which the image processing apparatus displays a plurality of quick view images.

Referring to FIG. 4, according to an embodiment of the present disclosure, the image processing apparatus 100 may enlarge parts of the face regions 321 through 331 of FIG. 3 and may sequentially display the enlarged face regions 321 through 331 at predetermined time intervals according to an input of the user or a previous usage pattern of the user.

Also, according to an embodiment of the present disclosure, the image processing apparatus 100 may set a person corresponding to the face region 321 from among people corresponding to the face regions 321 through 331 as an important person based on an input of the user. Alternatively, when the person corresponding to the face region 321 in previously captured images frequently appears, the image processing apparatus 100 may assign a high level of importance to the face region 321 from among the face regions 321 through 331. Accordingly, when the image processing apparatus 100 enlarges parts of the face regions 321 through 331 and sequentially displays the enlarged parts as quick view images at predetermined time intervals, the image processing apparatus 100 may set a period of time for which the face region 321 is enlarged and displayed to be longer than that of each of other face regions. The image processing apparatus 100 may set a period of time for which the face region 321 is enlarged and displayed to 3 seconds and a period of time for which remaining other face regions are enlarged and displayed to 1 second.

Figure 5:
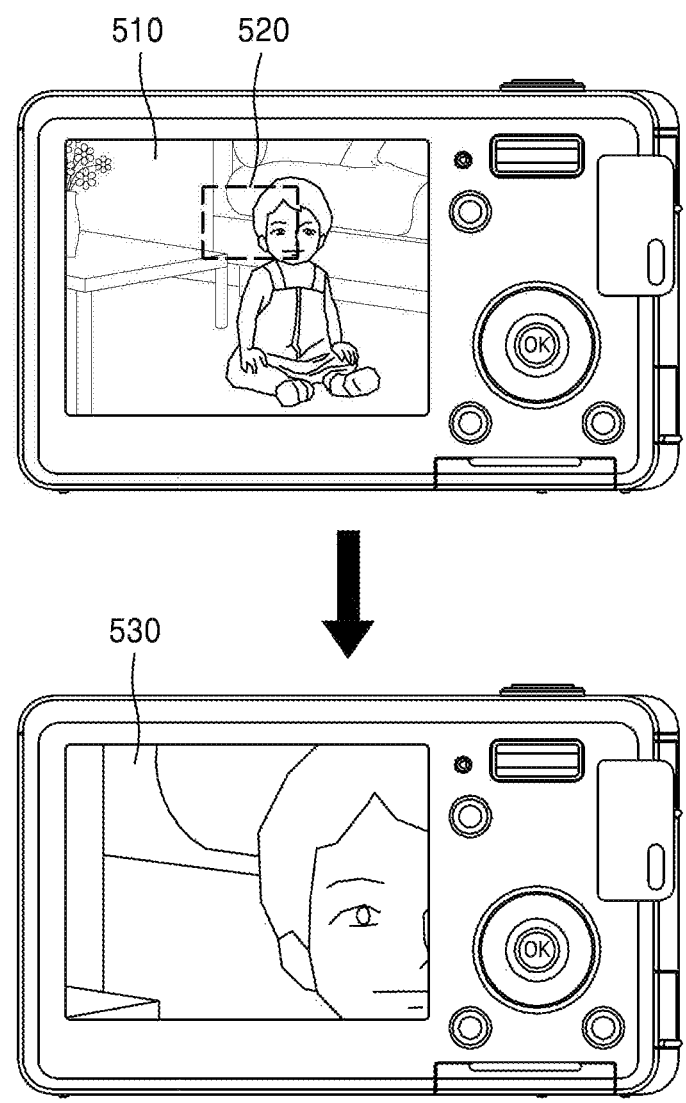
FIG. 5 is a diagram illustrating an example according to an embodiment of the present disclosure in which, when a captured image is a close-up photograph, the image processing apparatus generates a quick view image.

FIG. 5 is a diagram illustrating an example according to an embodiment of the present disclosure in which, when a captured image is a close-up photograph, the image processing apparatus generates a quick view image.

The image processing apparatus 100 may obtain a captured image 510 by imaging an object at close range. Next, the image processing apparatus 100 may determine a type of the captured image 510. That is, the image processing apparatus 100 may recognize that a focus of the captured image 510 is located at the front and a size of the object is at least equal to a predetermined size based on focus information of the captured image 510 and recognized size information of the object, and may determine that the type of the captured image 510 is a close-up photograph type. The object may be a human, an animal, or an inanimate object. Also, according to another embodiment of the present disclosure, the image processing apparatus 100 may determine that the type of the captured image 510 is a close-up photograph type according to a preset input of the user.

Next, the image processing apparatus 100 may generate a quick view image based on a user profile corresponding to the close-up photograph type. That is, when the type is a close-up photograph type, the image processing apparatus 100 may crop a region (hereinafter referred to as a "cropped region") 520 including a boundary of the recognized object according to the user profile on which a tendency of the user to check out-focusing in the captured image 510 is reflected. Accordingly, the image processing apparatus 100 may generate the cropped region 520 as a quick view image. Also, according to another embodiment, when the type is a close-up photograph type, the image processing apparatus 100 may generate the captured image 510 as a quick view image according to the user profile on which a tendency of the user not to enlarge the captured image 510 is reflected.

Accordingly, the image processing apparatus 100 may display an image 530 that is obtained by enlarging the cropped region 520 as a quick view image according to a preset method.

Figure 6:
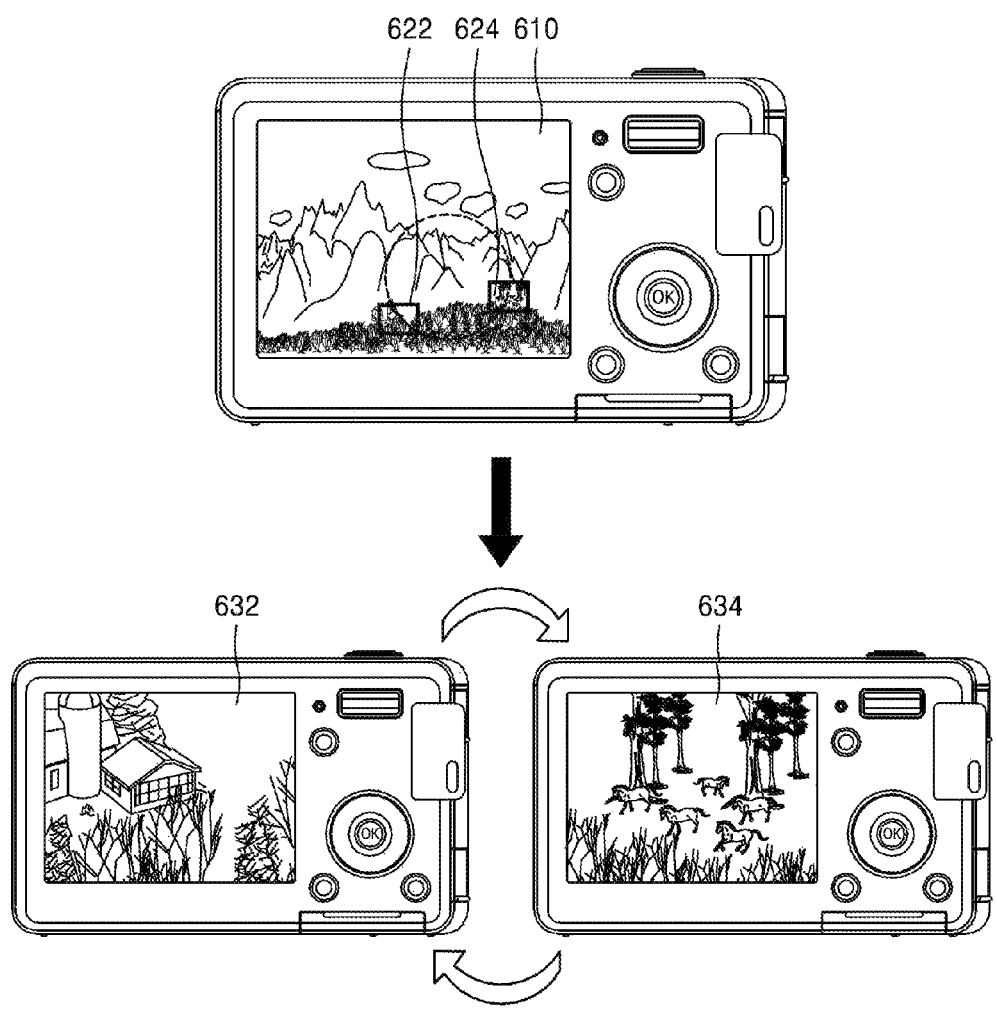
FIG. 6 is a diagram illustrating an example according to an embodiment of the present disclosure in which, when a captured image is a landscape photograph, the image processing apparatus generates a quick view image.

FIG. 6 is a diagram illustrating an example according to an embodiment of the present disclosure in which, when a captured image is a landscape photograph, the image processing apparatus generates a quick view image.

Referring to FIG. 6, according to an embodiment of the present disclosure, the image processing apparatus 100 may obtain a captured image 610 by imaging a landscape. Next, the image processing apparatus 100 may determine a type of the captured image 610. That is, the image processing apparatus 100 may recognize that a focus of the captured image 610 is located at the rear of the image, no recognized face region exists, and an object has a size at least equal to a predetermined size based on focus information, face recognition information, and object recognition information of the captured image 610, and may determine that the type of the captured image 610 is a landscape photograph type. Also, the image processing apparatus 100 may determine that type of the captured image 610 is a landscape photograph type according to a preset input of the user.

Next, the image processing apparatus 100 may generate quick view images based on a user profile corresponding to the landscape photograph type. That is, when the type is a landscape photograph type, the image processing apparatus 100 may crop regions 622 and 624 having frequencies higher than a preset frequency during image processing according to a user profile on which a tendency of the user to check a portion having many edges in the captured image 610 is reflected. Accordingly, the image processing apparatus 100 may generate the cropped regions 622 and 624 as quick view images.

Accordingly, the image processing apparatus 100 may alternately display images 632 and 634 that are obtained by enlarging parts of the cropped regions 622 and 624 according to a preset method.

Figure 7:
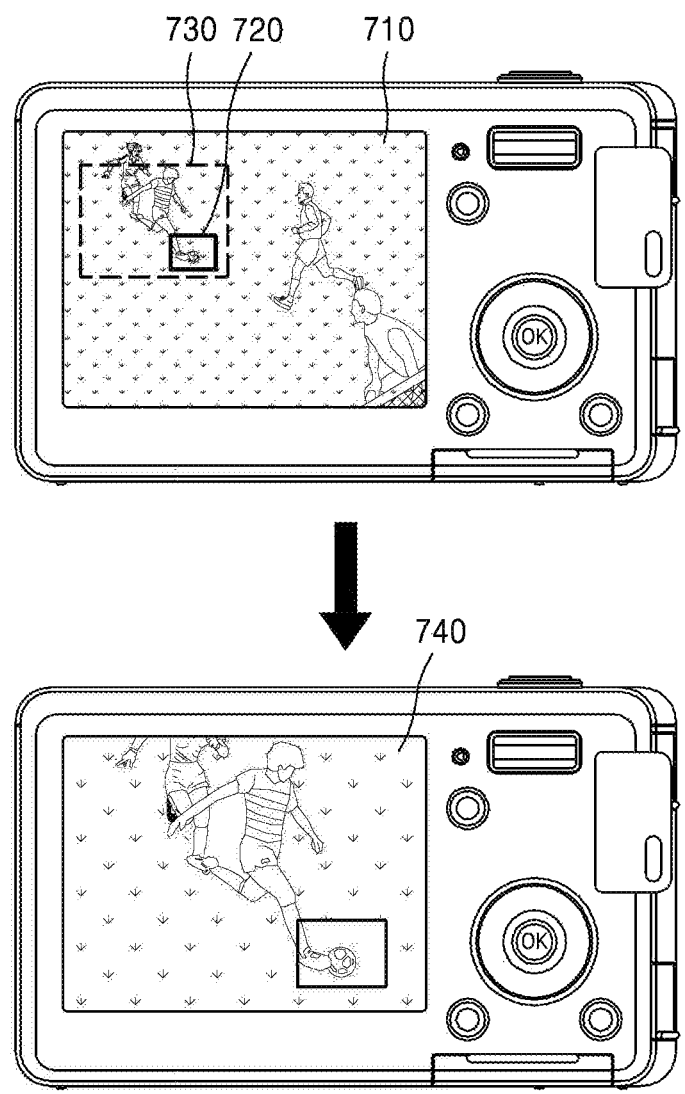
FIG. 7 is a diagram illustrating an example according to an embodiment of the present disclosure in which, when a captured image is a sports activity photograph, the image processing apparatus generates a quick view.

FIG. 7 is a diagram illustrating an example according to an embodiment of the present disclosure in which, when a captured image is a sports activity photograph, the image processing apparatus generates a quick view image.

Referring to FIG. 7, according to an embodiment of the present disclosure, the image processing apparatus 100 may obtain a captured image 710 by imaging people who play soccer. Next, the image processing apparatus 100 may determine a type of the captured image 710. That is, the image processing apparatus 100 may recognize a preset object 720 such as a soccer ball based on object recognition information of the captured image 710, and may determine that the type of the captured image 710 is a sports activity photograph type. Also, the image processing apparatus 100 may determine that the type of the captured image 710 is a sports activity photograph type according to a preset input of the user.

Next, the image processing apparatus 100 may generate a quick view image based on a user profile corresponding to the sports activity photograph type. That is, when the type is a sports activity photograph type, the image processing apparatus 100 may crop a region 730 around the preset object 720 according to a user profile on which a tendency of the user to check a region around a preset object such as a soccer ball is reflected. Accordingly, the image processing apparatus 100 may generate the cropped region 730 as a quick view image.

Accordingly, the image processing apparatus 1400 may display an image 740 that is obtained by enlarging the cropped region 730 as a quick view image according to a preset method.

Figure 8:
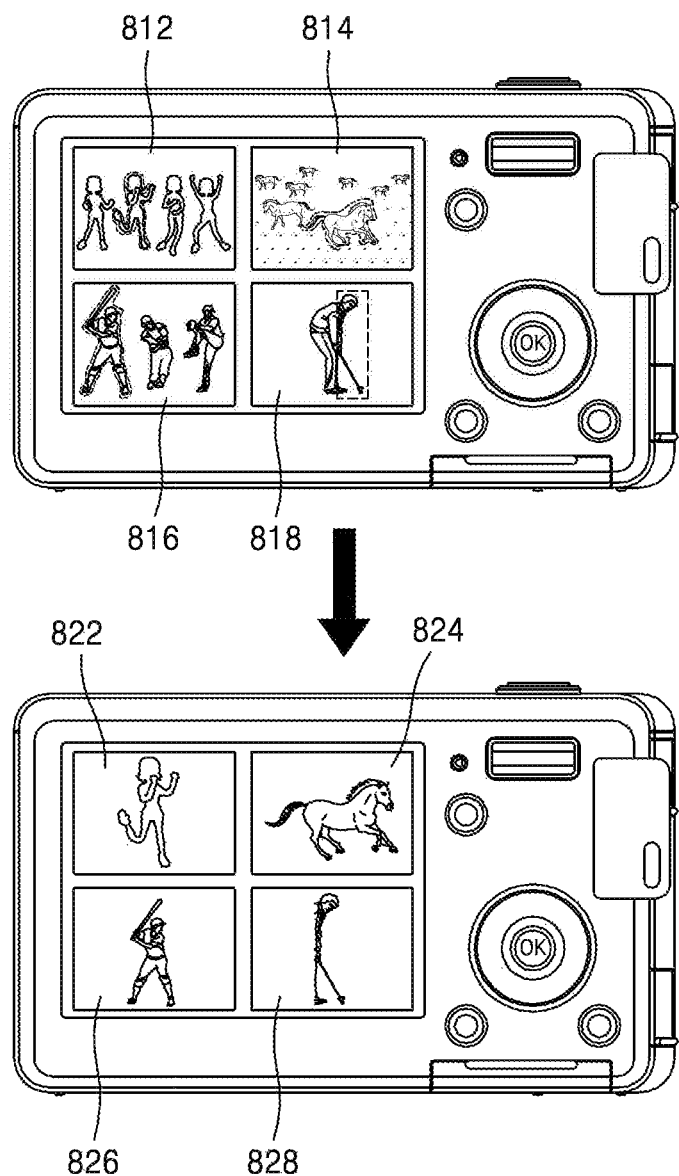
FIG. 8 is a diagram illustrating an example according to an embodiment of the present disclosure in which the image processing apparatus displays a plurality of thumbnail images and a plurality of quick view images.

FIG. 8 is a diagram illustrating an example according to an embodiment of the present disclosure in which the image processing apparatus 100 displays a plurality of thumbnail images and a plurality of quick view images.

Referring to FIG. 8, the image processing apparatus 100 may obtain a plurality of captured images from the outside and may display a plurality of thumbnail images 812, 814, 816, and 818 corresponding to the plurality of captured images. Also, according to another embodiment of the present disclosure, the image processing apparatus 100 may obtain a plurality of captured images by performing imaging a plurality of times and may display the plurality of thumbnail images 812, 814, 816, and 818 corresponding to the plurality of captured images.

Also, the image processing apparatus 100 may display a plurality of quick view images 822, 824, 826, and 828 based on a user profile determined according to a type of each of the plurality of images. According to an embodiment of the present disclosure, the image processing apparatus 100 may convert the plurality of thumbnail images 812, 814, 816, and 818 into the plurality of quick view images 822, 824, 826, and 828 and may display the plurality of quick view images 822, 824, 826, and 828 based on an input of the user.

Accordingly, since the user may check a region of interest by using the plurality of quick view images 822, 824, 826, and 828 displayed on the image processing apparatus 100, the user may determine whether to remove the plurality of captured images based on the plurality of quick view images 822, 824, 826, and 828 without performing an additional zoom-in operation on the plurality of captured images.

Figure 9:
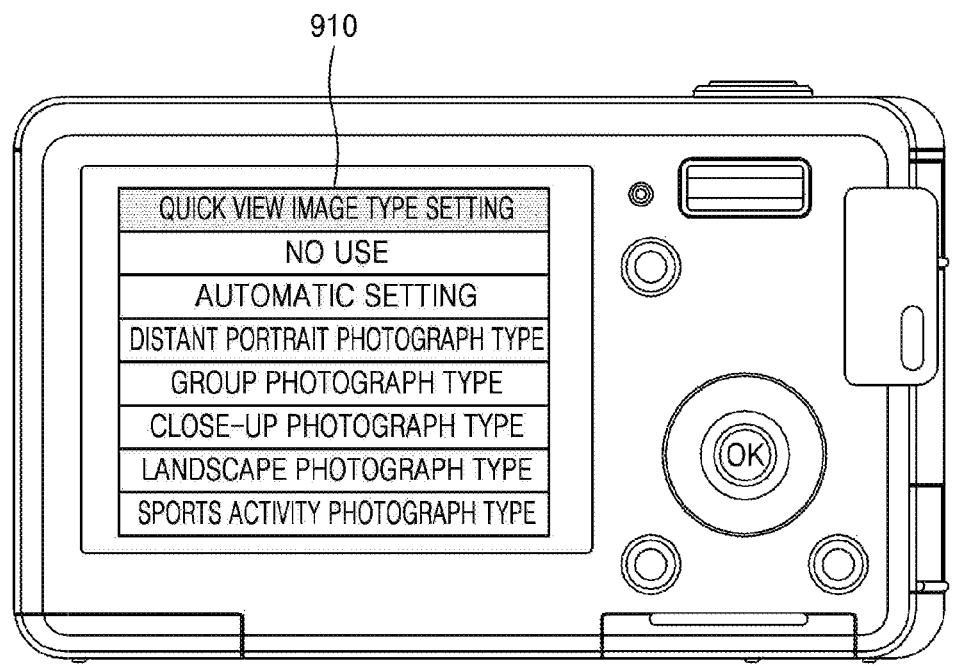
FIG. 9 is a diagram illustrating an example according to an embodiment of the present disclosure in which the image processing apparatus displays a menu for setting a quick view image type.

FIG. 9 is a diagram illustrating an example according to an embodiment of the present disclosure in which the image processing apparatus displays a menu for setting a quick view image type.

Referring to FIG. 9, according to an embodiment of the present disclosure, the image processing apparatus 100 may display a menu 910 for setting a quick view image type.

When the image processing apparatus 100 receives an input of the user that selects an item 'no use', the image processing apparatus 100 may not generate a quick view image of a captured image.

When the image processing apparatus 100 receives an input of the user that selects an item 'automatic setting', the image processing apparatus 100 may determine a type by analyzing the captured image. Accordingly, the image processing apparatus 100 may generate and display a quick view image according to a user profile corresponding to the determined type.

When the image processing apparatus 100 receives an input of the user that selects an item 'distant portrait photograph type', the image processing apparatus 100 may generate and display a quick view image from the captured image according to a user profile corresponding to the distant portrait photograph type. For example, when the type is a distant portrait photograph type, the image processing apparatus 100 may generate and display a quick view image showing a face region recognized in the captured image according to a user profile on which a tendency of the user to check a face region is reflected.

When the image processing apparatus 100 receives an input of the user that selects an item 'group photograph type', the image processing apparatus 100 may generate and display a quick view image from the captured image according to a user profile corresponding to the group photograph type. For example, when the type is a group photograph type, the image processing apparatus 100 may generate and display a quick view image showing face regions recognized in the captured image according to a user profile on which a tendency of the user to check a plurality of face regions is reflected.

When the image processing apparatus 100 receives an input of the user that selects an item 'close-up photograph type', the image processing apparatus 100 may generate and display a quick view image from the captured image according to a user profile corresponding to the close-up photograph type. For example, the image processing apparatus 100 may generate and display a quick view image showing a region including a boundary of an object according to a user profile on which a tendency of the user to check out-focusing in the captured image is reflected.

When the image processing apparatus 100 receives an input of the user that selects an item designated as "landscape photograph type", the image processing apparatus 100 may generate and display a quick view image from the captured image according to a user profile corresponding to the landscape photograph type. For example, the image processing apparatus 100 may generate and display a quick view image showing a region having a frequency higher than a preset frequency during image processing according to a user profile on which a tendency of the user to check a portion having many edges in the captured image is reflected.

When the image processing apparatus 100 receives an input of the user that selects an item designated as "sports activity photograph type", the image processing apparatus 100 may generate and display a quick view image from the captured image according to a user profile corresponding to the sports activity photograph type. For example, the image processing apparatus 100 may generate and display a quick view image showing a region around a preset object according to a user profile on which a tendency of the user to check a region around a preset object such as a soccer ball is reflected.

Also, according to an embodiment of the present disclosure, the image processing apparatus 100 may generate an item corresponding to another type according to an input of the user, and may generate and display a quick view image from the captured image according to a user profile corresponding to the another type.

Figure 10:
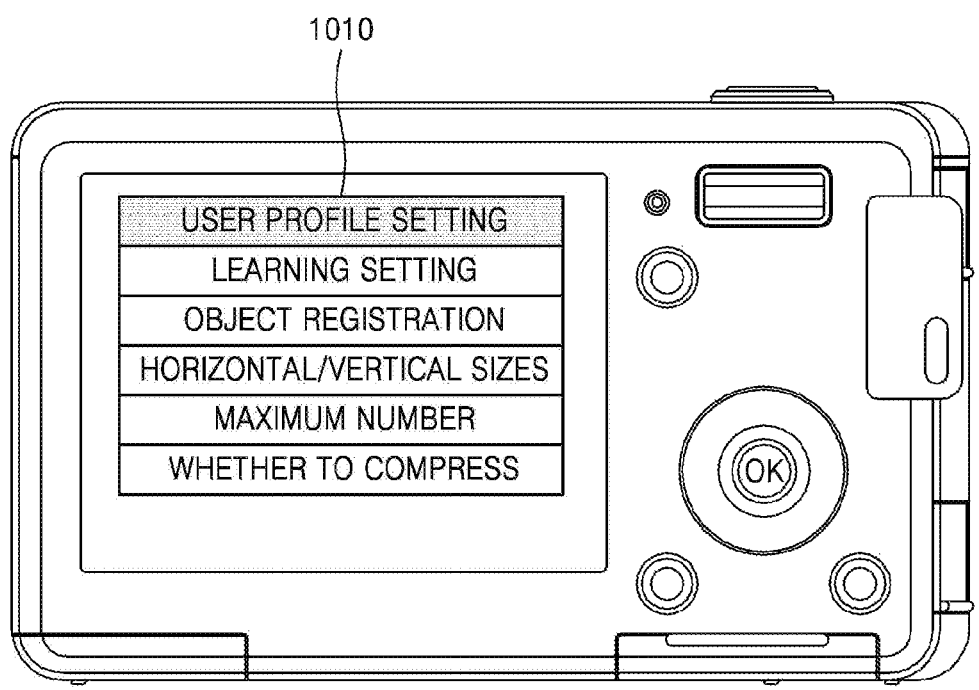
FIG. 10 is a diagram illustrating an example according to an embodiment of the present disclosure in which the image processing apparatus displays a menu for setting a quick view image.

FIG. 10 is a diagram illustrating an example according to an embodiment of the present disclosure in which the image processing apparatus displays a menu for setting a quick view image.

Referring to FIG. 10, according to an embodiment of the present disclosure, the image processing apparatus 100 may display a menu 1010 for setting a user profile.

The image processing apparatus 100 may receive an input of the user that selects an item designated as "learning setting", and may learn a previous usage pattern of the user and may determine a user profile on which the previous usage pattern of the user is reflected.

The image processing apparatus 100 may receive an input of the user that selects an item designated as "object registration", and may register an object designated by the user as an object having a high importance based on an input of the user. Accordingly, when a plurality of objects are recognized in the captured image, the image processing apparatus 100 may preferentially display a quick view image of the object designated by the user.

The image processing apparatus 100 may receive an input of the user that selects an item designated as "horizontal/vertical sizes", and may set horizontal/vertical sizes of a quick view image according to an input of the user. Also, according to another embodiment of the present disclosure, when there is no additional input of the user, the image processing apparatus 100 may determine horizontal/vertical sizes of a quick view image according to a user profile on which the previous usage pattern of the user is reflected.

Also, the image processing apparatus 100 may receive an input of the user that selects an item designated as "whether to compress", and may determine whether to compress and store the quick view image according to an input of the user.

Also, the image processing apparatus 100 may receive an input of the user that selects an item designated as "maximum number", and may set a maximum number of quick view images to be displayed on a screen according to an input of the user.

Also, according to an embodiment of the present disclosure, the image processing apparatus 100 may generate an item corresponding to another type according to an input of the user, and may generate and display a quick view image according to the other type.

Figure 11:
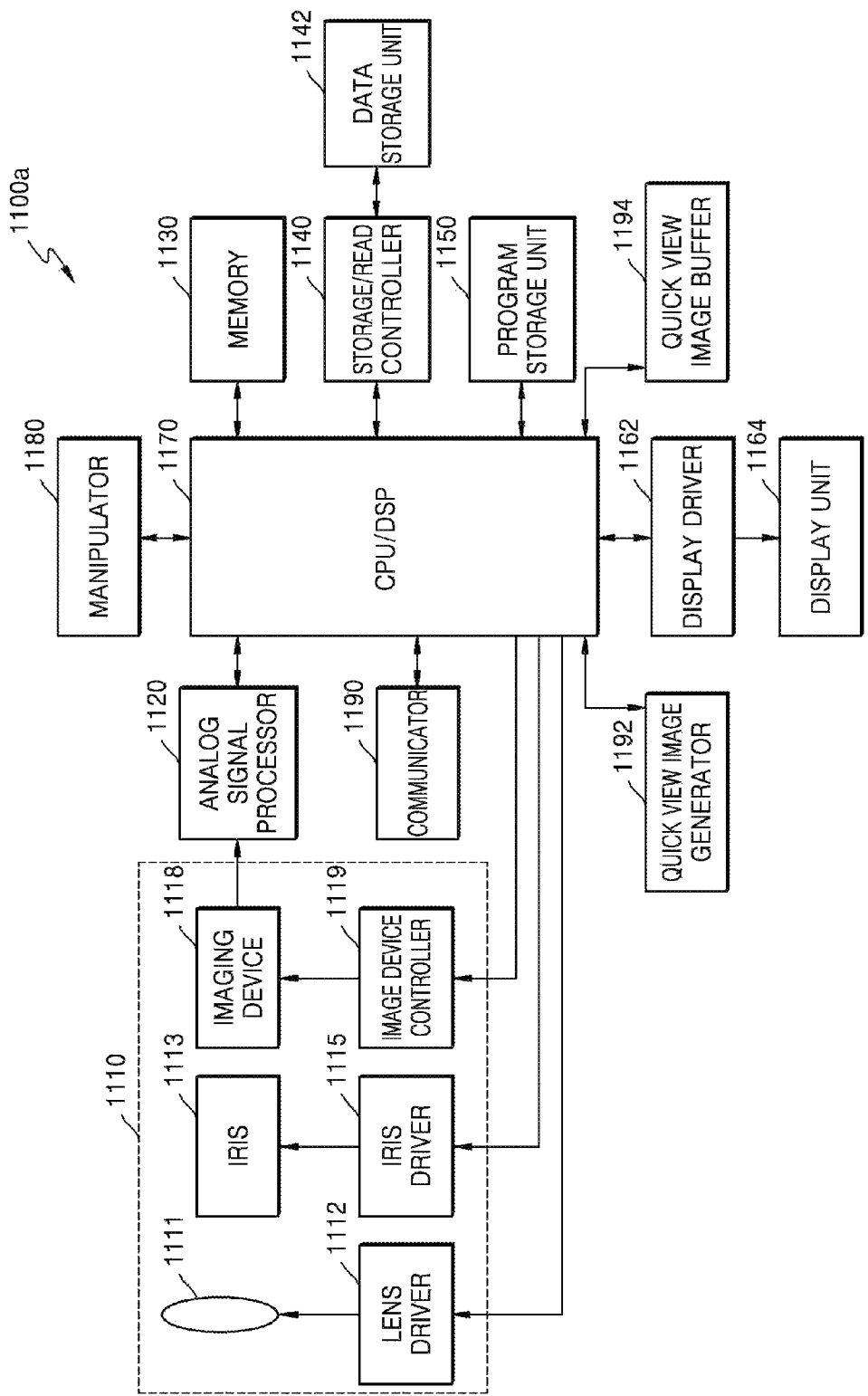
FIG. 11 is a block diagram illustrating an image processing apparatus according to another embodiment of the present disclosure.

FIG. 11 is a diagram illustrating an image processing apparatus according to another embodiment of the present disclosure.

Referring to FIG. 11, according to an embodiment of the present disclosure, the image processing apparatus 1100a includes an imager 1110, an analog signal processor 1120, a memory 1130, a storage/read controller 1140, a data storage unit 1142, a program storage unit 1150, a display driver 1162, a display unit 1164, a central processing unit/digital signal processor (CPU/DSP) 1170, a manipulator 1180, a quick view image generator 1192, and a quick view image buffer 1194. General-purpose elements other than the elements illustrated in FIG. 1 may be further included in the image processing apparatus 1100a.

The quick view image generator 1192 and the display unit 1164 are similar to the quick view image generator 120 and the display unit 130 of FIG. 1, and thus a repeated explanation is omitted herein for clarity and conciseness. Also, the imager 1110 may correspond to the image obtainer 110 of FIG. 1, and thus a repeated explanation is omitted herein for clarity and conciseness.

According to an embodiment of the present disclosure, the quick view image buffer 1194 may temporarily store a quick view image that is generated by the quick view image generator 1192. Also, the quick view image buffer 1194 may store a compressed quick view image according to an embodiment. The CPU/DSP 1170 may rapidly read the quick view image stored in the quick view image buffer 1194 and may display the quick view image on the display unit 1164.

An overall operation of the image processing apparatus 1100a is controlled by the CPU/DSP 1170. The CPU/DSP 1170 transmits a control signal for operating elements included in the image processing apparatus 1000a such as a lens driver 1112, an iris driver 1115, an imaging device controller 1119, the display driver 1162, and the manipulator 1180.

The imager 1110, which is an element for generating an image of an electrical signal from incident light, includes a lens 1111, the lens driver 1112, an iris 1113, the iris driver 1115, an imaging device 1118, and the imaging device controller 1119.

The lens 1111 may include groups of lenses or a plurality of lenses. A position of the lens 1111 is adjusted by the lens driver 1112. The lens driver 1112 adjusts a position of the lens 1111 according to a control signal transmitted by the CPU/DSP 1170.

A size of an opening of the iris 1113 is adjusted by the iris driver 1115, and the iris 1113 adjusts the amount of light incident on the imaging device 1118.

An optical signal having passed through the lens 1111 and the iris 1113 reaches a light-receiving surface of the imaging device 1118 to form an image of a subject. The imaging apparatus 1118 may be a charge-coupled device (CCD) image sensor or a complementary metal-oxide-semiconductor image sensor (CIS) for converting an optical signal into an electrical signal. A sensitivity of the imaging device 1118 may be adjusted by the imaging device controller 1119. The imaging device controller 1119 may control the imaging device 1118 according to a control signal that is automatically generated by an image signal that is input in real time or a control signal that is manually input by the user's manipulation.

An exposure time of the imaging device 1118 is adjusted by a shutter. The shutter is classified into a mechanical shutter that adjusts the incidence of light by moving the iris 1113 or an electronic shutter that controls light exposure by applying an electrical signal to the imaging device 1118.

The analog signal processor 1120 performs noise reduction, gain adjustment, waveform shaping, or analog-to-digital conversion on an analog signal applied from the imaging device 1118.

A signal processed by the analog signal processor 1120 may be input to the CPU/DSP 1170 through the memory 1130, or may be directly input to the CPU/DSP 1170 without passing through the memory 1130. The memory 1130 operates as a main memory of the image processing apparatus 1100a, and temporarily stores information for operating the CPU/DSP 1170. The program storage unit 1130 stores a program such as an operating system or an application system for driving the image processing apparatus 1100a.

In addition, the image processing apparatus 1100a includes the display unit 1164 that displays information about an image captured by the image processing apparatus 1100a or an operation state of the image processing apparatus 1100a. The display unit 1164 may transmit visual information and/or auditory information to the user. In order to transmit visual information, the display unit 1164 may include, for example, a liquid crystal display (LCD) panel or an organic light-emitting display (OLED) panel.

Also, the image processing apparatus 1100a may include two or more display units 1164, and may be a touchscreen that may recognize a touch input. For example, the image processing apparatus 1100a may include a display unit that displays a live view image showing an object to be imaged and a display unit that displays an image showing a state of the image processing apparatus 1100a.

The display driver 1162 applies a driving signal to the display unit 1164.

The CPU/DSP 1170 processes an input image signal, and controls each element according to the input image signal or an external input signal. The CPU/DSP 1170 may perform image signal processing such as noise reduction, gamma correction, color filter array interpolation, color matrix, color correction, or color enhancement on input image data to improve image quality. Also, the CPU/DSP 1170 may generate an image file by compressing image data generated by performing the image signal processing for improving image quality, or may restore image data from the image file. An image compression method may be reversible or irreversible. For example, when an image is a still image, joint photographic experts group (JPEG) or JPEG 2000 may be used. Also, when an image is a moving image, a video file may be generated by compressing a plurality of frames according to the moving picture experts group (MPEG) standard. The image file may be generated according to, for example, the exchangeable image file format (Exif) standard.

Image data output from the CPU/DSP 1170 is input directly or through the memory 1130 to the storage/read controller 1140. The storage/read controller 1140 stores the image data in the data storage unit 1142 automatically or according to a signal from the user. Also, the storage/read controller 1140 may read data about an image from an image file stored in the data storage unit 1142, may input the data to a display driver through the memory 1130 or another path, and may allow the image to be displayed on the display unit 1164. The data storage unit 1142 may be detachably attached to the image processing apparatus 1100a or may be permanently mounted on the image processing apparatus 1100a.

Also, the CPU/DSP 1170 may perform unclearness processing, color processing, blur processing, edge emphasis, image analysis, image recognition, or image effect. Face recognition or scene recognition may be performed as image recognition. In addition, the CPU/DSP 1170 may perform display image signal processing to display the image on the display unit 1164. For example, the CPU/DSP 1170 may perform brightness level adjustment, color correction, contrast adjustment, contour emphasis, screen splitting, character image generation, or image synthesis. The CPU/DSP 1170 may be connected to an external monitor, may perform predetermined image signal processing to display the image on the external monitor, may transmit processed image data, and may allow a corresponding image to be displayed on the external monitor.

Also, the CPU/DSP 1170 may execute a program that is stored in the program storage unit 1150, may include an additional module to generate a control signal for controlling such as auto-focusing, zoom changing, focus changing, or auto-exposure correction, may apply the control signal to the iris driver 115, the lens driver 1112, and the imaging device controller 1118, and may generally control operations of elements included in the image processing apparatus 1100a such as a shutter and a strobe.

The manipulator 1180 is an element via which the user may input a control signal. The manipulator 1180 may include various functional buttons such as a shutter-release button that inputs a shutter-release signal for capturing an image by exposing the imaging device 1118 to light for a predetermined period of time, a power button that inputs a control signal for controlling power supply, a zoom button that widens or narrows an angle of view according to an input, a mode selection button, and an imaging setting value adjustment button. The manipulator 1180 may be any type via which the user may input a control signal such as buttons, a keyboard, a touchpad, a touchscreen, or a remote controller.

Also, according to an embodiment of the present disclosure, the manipulator 1180 may receive an input of the user that determines a user profile, a type of a quick view image, or a method of displaying the quick view image.

The communicator 190 may include a network interface card (NIC) or a modem, and may enable the image processing apparatus 100 to wiredly or wirelessly communicate with an external device through a network.

Figure 12:
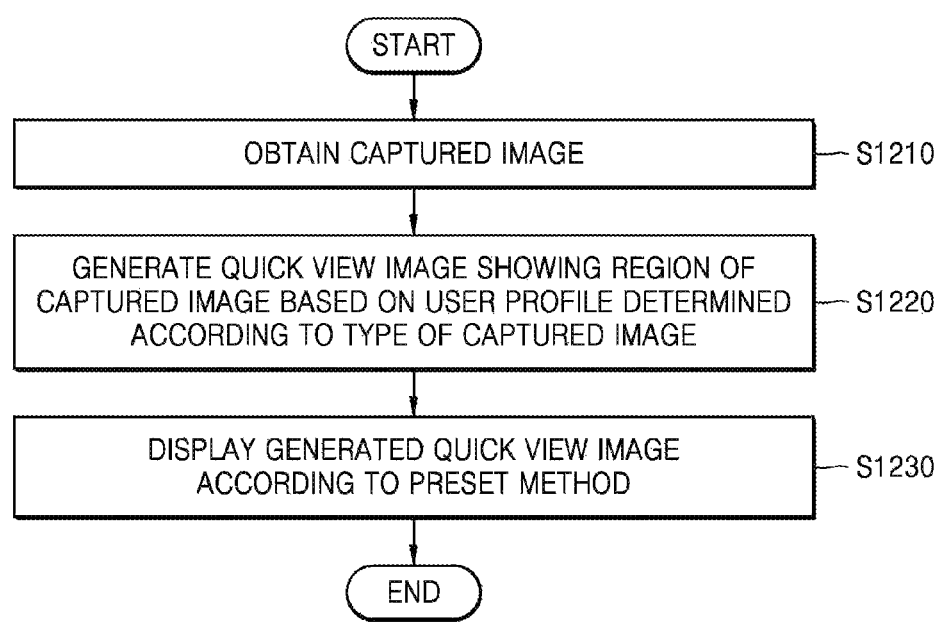
FIG. 12 is a flowchart illustrating a method of operating the image processing apparatus according to an embodiment of the present disclosure.

FIG. 12 is a flowchart illustrating a method of operating an image processing apparatus according to an embodiment of the present disclosure.

The method of FIG. 12 may be performed by the image processing apparatus 100 or 1100 of FIG. 1 or 11.

Referring to FIG. 12, in step S1210, according to an embodiment of the present disclosure, the image processing apparatus 100 or 1100a obtains a captured image. The image processing apparatus 100 or 1100a may obtain image by directly imaging a subject. Also, the image processing apparatus 100 or 1100a may obtain an image, which is captured by an external apparatus, from the external apparatus.

In step S1220, according to an embodiment of the present disclosure, the image processing apparatus 100 or 1100a generates a quick view image showing a region of the captured image based on a user profile determined according to a type of the captured image. Also, the user profile may be set differently according to the type of the captured image. That is, the user profile may be set differently according to whether the type of the captured image is a distant portrait photograph type or a close-up portrait photograph type. Accordingly, the image processing apparatus 100 or 1100a may set user profiles differently according to types of the captured image.

According to an embodiment of the present disclosure, the image processing apparatus 100 or 1100a may determine a user profile on which a previous usage pattern of a user is reflected. That is, the image processing apparatus 100 or 1100a may learn the previous usage pattern of the user, and may determine which region of the captured image is to be shown by a quick view image and a size of the quick view image. Also, the image processing apparatus 100 or 1100a may update the user profile as the usage pattern of the user changes.

Also, according to an embodiment of the present disclosure, the image processing apparatus 100 or 1100a may determine, in advance, a user profile based on an input of the user. That is, the image processing apparatus 100 or 1100a may determine, in advance, which region of the captured image is to be shown by a quick view image and a size of the quick view image based on an input of the user. Accordingly, the image processing apparatus 100 or 1100a may generate a quick view image according to the user profile that is determined in advance.

According to an embodiment of the present disclosure, the image processing apparatus 100 or 1100a may determine a type of the captured image. That is, the image processing apparatus 100 or 1100a may analyze the captured image and may determine whether the type of the captured image is a distant portrait photograph type, a group photograph type, a landscape photograph type, a sports activity photograph type, or a close-up photograph type. The image processing apparatus 100 or 1100a may determine the type of the captured image based on focus information and face recognition information of the captured image. For example, when a focus of the captured image is located at the rear and a recognized face exists, the image processing apparatus 100 or 1100a may determine that the type of the captured image is a distant portrait photograph type. Accordingly, the image processing apparatus 100 or 1100a may generate a quick view image according to a user profile corresponding to the determined type. For example, the image processing apparatus 100 or 1100a may generate a plurality of face regions recognized in the captured image as a plurality of quick view images according to a user profile corresponding to a group photograph type.

According to an embodiment of the present disclosure, the image processing apparatus 100 or 1100a may store the generated quick view image in an internal memory. Also, the image processing apparatus 100 or 1100a may temporarily store the generated quick view image in a quick view image buffer.

In step S1230, according to an embodiment of the present disclosure, the image processing apparatus 100 or 1100a displays the generated quick view image according to a preset method. For example, the image processing apparatus 100 or 1100a may enlarge the generated quick view image by a predetermined size and may display the enlarged quick view image on a screen of the image processing apparatus 100 or 1100a. Also, the image processing apparatus 100 or 1100a may enlarge the generated quick view image by a predetermined size and may display the enlarged quick view image for a predetermined period of time. Also, the image processing apparatus 100 or 1100a may enlarge and display a plurality of quick view images at preset time intervals. Also, the image processing apparatus 100 or 1100a may learn a previous usage pattern of the user and may determine a method of displaying the quick view image. Also, the image processing apparatus 100 or 1100a may display the quick view image stored in the quick view image buffer. Accordingly, since the image processing apparatus 100 or 1100a may read and display the quick view image stored in the quick view image buffer, the image processing apparatus 100 or 1100a may display the quick view image faster than when reading and displaying the quick view image stored in the internal memory.

Figure 13:
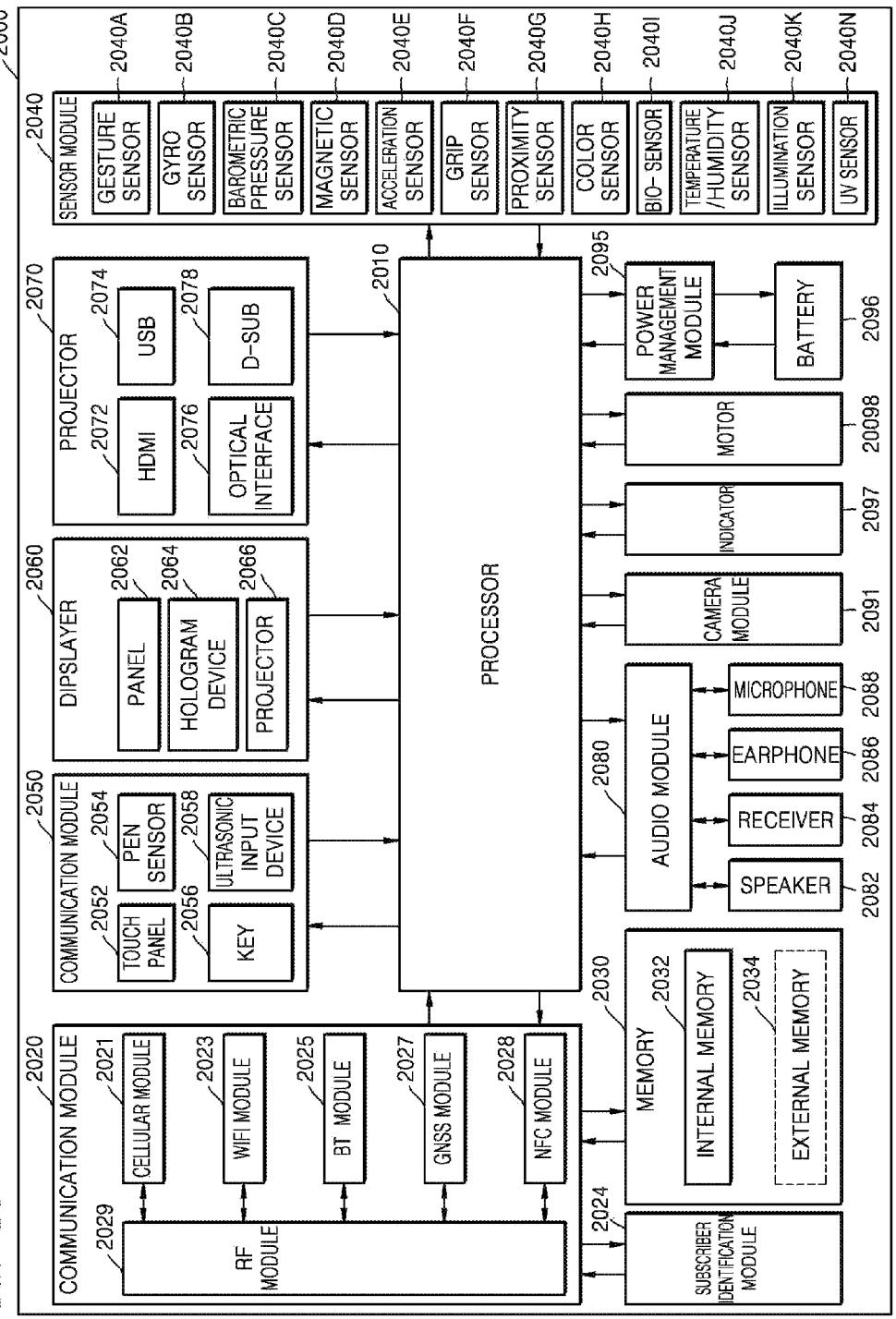
FIG. 13 is a block diagram illustrating an image processing apparatus according to another embodiment of the present disclosure.

FIG. 13 is a block diagram illustrating an image processing apparatus according to another embodiment of the present disclosure.

For example, an electronic apparatus 2000 may include a part or the whole of the image processing apparatus 100 or 1100a of FIG. 1 or 11. The electronic apparatus 2000 includes at least one processor (e.g., a CPU/DSP or an application processor (AP)) 2010, a communication module 2020, a subscriber identification module 2024, a memory 2030, a sensor module 2040, an input unit 2050, a display 2060, an interface 2070, an audio module 2080, a camera module 2091, a power management module 2095, a battery 2096, an indicator 2097, and a motor 2098.

The processor 2010 may control a plurality of hardware or software elements connected to the processor by driving, for example, an operating system or an application program, and may perform various data processing and calculations. The processor 2010 may be, for example, a system-on-chip (SoC). According to an embodiment of the present disclosure, the processor 2010 may further include a graphics processing unit (GPU) and/or an image signal processor. The processor 2010 may include at least some elements (e.g., a cellular module 2021) from among elements of FIG. 1. The processor 2010 may load a command or data received from at least one of other elements (e.g., a nonvolatile memory) to a volatile memory, may process the command or the data, and may store various data in the nonvolatile memory.

The communication module 2020 includes, for example, the cellular module 2021, a WiFi module 2023, a Bluetooth module 2025, a global navigation satellite system (GNSS) module 2027 (e.g., a global positioning system (GPS) module, a Glonass module, a Beidou module, or a Galileo module), a near field communication (NFC) module 2028, and a radio frequency (RF) module 2029.

The cellular module 2021 may provide, for example, a voice call service, a video call service, a text service, or an Internet service through a communication network. According to an embodiment of the present disclosure, the cellular module 2021 may identify and authenticate the electronic apparatus 2000 in the communication network by using the subscriber identification module (e.g., a SIM card) 2024. The cellular module 2021 may perform at least some from among functions that may be provided by the processor 2010. The cellular module 2021 may include a communication processor (CP).

Each of the WiFi module 2023, the Bluetooth module 2025, the GNSS module 2027, and the NFC module 2028 may include a processor for processing data that is transmitted/received through the module. According to an embodiment of the present disclosure, two or more of the cellular module 2021, the WiFi module 2023, the Bluetooth module 2025, the GNSS module 2027, and the NFC module 2028 may be included in one integrated chip (IC) or an IC package.

The RF module 2029 may transmit/receive, for example, a communication signal (e.g., an RF signal). The RF module 2029 may include, for example, a transceiver, a power amplification module (PAM), a frequency filter, a low noise amplifier (LNA), or an antenna. According to another embodiment of the present disclosure, at least one of the cellular module 2021, the WiFi module 2023, the Bluetooth module 2025, the GNSS module 2027, and the NFC module 2028 may transmit/receive an RF signal through an additional RF module.

The subscriber identification module 2024 may include, for example, a card including a subscriber identification module and/or an embedded SIM, and may include unique identification information (e.g., an integrated circuit card identifier (ICCID)) or subscriber information (e.g., an international mobile subscriber identity (MI)).

The memory 2030 may include, for example, an internal memory 2032 or an external memory 2034. The internal memory 2032 may include at least one of, for example, a volatile memory (e.g., a dynamic random-access memory (DRAM)), a static RAM (SRAM), or a synchronous dynamic RAM (SDRAM)), and a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive, or a solid-state drive (SSD)).

The external memory 2034 may further include a flash drive such as a compact flash (CF), a secure digital (SD), a micro-SD, a mini-SD, an extreme digital (xD), a multimedia card (MMC), or a memory stick. The external memory 2034 may be functionally and/or physically connected to the electronic apparatus 2000 through various interfaces.

The sensor module 2040 may, for example, measure a physical quantity or detect an operation state of the electronic apparatus 2000 and may convert measured or detected information into an electrical signal. The sensor module 2040 includes, for example, a gesture sensor 2040A, a gyro sensor 2040B, a barometric pressure sensor 2040C, a magnetic sensor 2040D, an acceleration sensor 2040E, a grip sensor 2040F, a proximity sensor 2040G, a color sensor 2040H (e.g., a red, green, and blue (RGB) sensor), a bio-sensor 2040I, a temperature/humidity sensor 2040J, an illumination sensor 2040K, and an ultraviolet (UV) sensor 2040N. Additionally or alternatively, the sensor module 2040 may include, for example, an E-nose sensor, an electromyography (EMG) sensor, an electroencephalogram (EEG) sensor, an ECG sensor, an infrared (IR) sensor, an iris sensor, and/or a fingerprint sensor. The sensor module 2040 may further include a control circuit for controlling one or more sensors included in the sensor module 2040. According to an embodiment of the present disclosure, the electronic apparatus 2000 may further include a processor that is a part of the processor 2010 or an additional processor and is configured to control the sensor module 2040, and thus may control the sensor module 2040 while the processor 2010 is in a sleep mode.

The input unit 2050 may include, for example, a touch panel 2052, a (digital) pen sensor 2054, a key 2056, or an ultrasonic input device 2058. The touch panel 2052 may use at least one of, for example, a capacitive method, a resistive method, an infrared method, and an ultrasonic method. Also, the touch panel 2052 may further include a control circuit. The touch panel 2052 may further include a tactile layer and may apply a tactile response to the user.

The (digital) pen sensor 2054 may be, for example, a part of the touch panel, or may include an additional recognition sheet. The key 2056 may include, for example, a physical button, an optical key, or a keypad. The ultrasonic input device 2058 may detect ultrasonic waves generated in an input device through a microphone 2088 and may check data corresponding to the detected ultrasonic waves.

The display unit 2060 (e.g., the display unit 164) may include a panel 2062, a hologram device 2064, or a projector 2066. The panel 2062 may be, for example, flexile, transparent, or wearable. The panel 2062 may be configured as a single module along with the touch panel 2052. The hologram device 2064 may show a stereoscopic image in the air by using the interference of light. The projector 2066 may display an image by projecting light to a screen. The screen may be located inside or outside the electronic apparatus 2000. According to an embodiment of the present disclosure, the display unit 2060 may further include a control circuit for controlling the panel 2062, the hologram device 2064, or the projector 2066.

The interface 2070 includes, for example, a high-definition multimedia interface (HDMI) 2072, a universal serial bus (USB) 2074, an optical interface 2076, and a D-sub-miniature (D-sub) 2078. Additionally or alternatively, the interface 2070 may include, for example, a mobile high-definition link (MHL) interface, a secure digital (SD) card/MMC interface, or an infrared data association (IrDA) standard interface.

The audio module 2080 may convert between, for example, a sound and an electrical signal. The audio module 2080 may process sound information input or output through, for example, a speaker 2082, a receiver 2084, an earphone 2086, or the microphone 2088.

According to an embodiment of the present disclosure, the camera module 2091 is a device for capturing, for example, a still image and a moving image, may include at least one image sensor (e.g., a front sensor or a rear sensor), a lens, an image signal processor (ISP), or a flash (e.g., a light-emitting diode (LED) or a xenon lamp).

The power management module 2095 may manage, for example, power of the electronic apparatus 2000. According to an embodiment of the present disclosure, the power management module 2095 may include a power management integrated circuit (PMIC), a charger IC, or a battery gauge. The PMIC may use a wired and/or wireless charging method. The wireless charging method may include, for example, a magnetic resonance method, a magnetic induction method, or an electromagnetic method, and an additional circuit for wirelessly charging such as a coil loop, a resonant circuit, or a rectifier may be added. The battery gauge may measure, for example, a remaining amount of the battery 2096, or a voltage, a current, or a temperature during the charging. The battery 2096 may include, for example, a rechargeable battery and/or a solar battery.

The indicator 2097 may display a specific state of the electronic apparatus 2000 or a part of the electronic apparatus (e.g., the processor 2010), for example, a booting state, a message state, or a charging state. The motor 2098 may convert an electrical signal into a mechanical vibration and may generate a vibration or haptic effect. The electronic apparatus 2000 may include a processing device (e.g., a GPU) for supporting a mobile TV. The processing device for supporting a mobile TV may process media data according to the standard such as digital multimedia broadcasting (DMB), digital video broadcasting (DVB), or mediaFlo.

Each element described herein may include one or more components, and the name of the element may vary according to a type of the electronic apparatus. In various embodiments, the electronic apparatus may include at least one of the elements described herein, and some of the elements may be omitted or an additional element may be further included. Also, according to various embodiments of the present disclosure, some of the elements of the electronic apparatus may be combined into a single entity, and may perform the same function as those of the elements before being combined.

The devices described herein may include a processor, a memory for storing and executing program data, a permanent storage unit such as a disk drive, a communication port for communicating with an external device, and a user interface device such as a touch panel, a key, or a button. Any methods may be performed by using software modules or algorithms, and may be stored as program instructions or computer-readable codes executable by the processor on a computer-readable medium. Examples of the computer-readable medium may include a magnetic storage medium (e.g., a read-only memory (ROM), a random-access memory (RAM), a floppy disk, or a hard disk) and an optical recording medium (e.g., a CD-ROM or a digital versatile disk (DVD)). The computer-readable recording medium may also be distributed over network coupled computer systems so that the computer-readable code is stored and executed in a distributed fashion. This medium may be read by the computer, stored in the memory, and executed by the processor.

The embodiments of the present disclosure may be described in terms of functional blocks and various processing steps. The functional blocks may be realized by any number of hardware and/or software components configured to perform specific functions. For example, embodiments of the present disclosure may employ various integrated circuit components, e.g., memory elements, processing elements, logic elements, and look-up tables, which may carry out a variety of functions under the control of one or more microprocessors or other control devices. Similarly, where the elements of embodiments of the present disclosure are implemented using software programming or software elements, embodiments of the present disclosure may be implemented with any programming or scripting language such as C, C++, Java, assembler, or the like, with various algorithms being including any combination of data structures, processes, routines or other programming elements. Functional aspects may be implemented in algorithms that are executed on one or more processors. Furthermore, embodiments of the present disclosure could employ any number of conventional techniques for electronic configuration, signal processing, and/or data processing. The terms "mechanism", "element", "means", and "configuration" may be used broadly and are not limited to mechanical or physical embodiments, but can include software routines in conjunction with processors, etc.

The particular implementations shown and described herein are illustrative examples of embodiments of the present disclosure and are not intended to otherwise limit the scope of embodiments of the present disclosure in any way. For the sake of brevity, conventional electronics, control systems, software, and other functional aspects of systems may not be described in detail. Furthermore, connecting lines, or connectors shown in the various figures are intended to represent exemplary functional relationships and/or physical or logical couplings between various elements. It should be noted that many alternative or additional functional relationships, physical connections, or logical connections may be present in a practical device.

The use of the terms "a" and "an" and "the" and similar referents in the context of describing embodiments of the present disclosure (especially in the context of the following claims) are to be construed to cover both the singular and the plural. Furthermore, recitations of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context.

Embodiments of the present disclosure are not limited to the described order of the steps. The use of any and all examples provided herein, is intended merely to better illuminate embodiments of the present disclosure and does not pose a limitation on the scope of embodiments of the present disclosure unless otherwise claimed. Numerous modifications and adaptations will be readily apparent to one of ordinary skill in this art without departing from the spirit and scope of embodiments of the present disclosure, as defined by the appended claims and their equivalents.

What is claimed is:

1. An image processing apparatus comprising:
   an image obtainer configured to obtain a captured image;
   a quick view image generator configured to generate a quick view image showing at least some regions of the captured image based on a user profile determined according to a type of the captured image and determine the at least some regions of the captured image based on the user profile reflecting tendency of a user viewing the quick view image; and
   a display configured to display the generated quick view image according to a preset method,
   wherein the type of the captured image is determined based on at least one of number, position and activity of persons included in the captured image.

2. The image processing apparatus of claim 1, wherein the quick view image generator is further configured to learn a previous usage pattern of the user and determine the user profile based on the previous usage pattern of the user.

3. The image processing apparatus of claim 1, wherein the quick view image generator is further configured to:
   determine the type by analyzing the captured image, and
   generate the quick view image based on the user profile determined according to the determined type.

4. The image processing apparatus of claim 3, wherein the quick view image generator is further configured to analyze the captured image based on focus information and face recognition information of the captured image.

5. The image processing apparatus of claim 1, wherein at least one of the user profile, the type of the captured image, and the preset method is set based on an input of the user.

6. The image processing apparatus of claim 1, further comprising a quick view image buffer configured to temporarily store the generated quick view image.

7. The image processing apparatus of claim 1, wherein the type of the captured image comprises at least one of a distant portrait photograph type, a close-up photograph type, a landscape photograph type, a sports activity photograph type, and group photograph type.

8. The image processing apparatus of claim 1, wherein the image obtainer is further configured to capture a plurality of images, the quick view image generator is further configured to generate a plurality of quick view images corresponding to the plurality of images, and
   the display is further configured to display at least one of a plurality of thumbnail images and the plurality of quick view images corresponding to the plurality of images.

9. An image processing method comprising:
   obtaining a captured image;
   generating a quick view image showing at least some regions of the captured image based on a user profile determined according to a type of the captured image, wherein the at least some regions of the captured image is determined based on the user profile reflecting tendency of a user viewing the quick view image; and
   displaying the generated quick view image according to a preset method,
   wherein the type of the captured image is determined based on at least one of number, position and activity of persons included in the captured image.

10. The image processing method of claim 9, wherein generating the quick view image comprises learning a previous usage pattern of the user and determining the user profile based on the previous usage pattern of the user.

11. The image processing method of claim 9, wherein generating the quick view image comprises:
    determining the type by analyzing the captured image; and
    generating the quick view image based on the user profile determined according to the determined type.

12. The image processing method of claim 11, wherein determining the type comprises analyzing the captured image based on focus information and face recognition information of the captured image.

13. The image processing method of claim 9, wherein at least one of the user profile, the type of the captured image, and the preset method is set based on an input of the user.

14. The image processing method of claim 9, further comprising temporarily storing the generated quick view image.

15. The image processing method of claim 9, wherein the type of the captured image comprises at least one of a distant portrait photograph type, a close-up photograph type, a landscape photograph type, a sports activity photograph type, and a group photograph type.

16. The image processing method of claim 9, further comprising:
   capturing a plurality of images;
   generating a plurality of quick view images corresponding to the plurality of images; and
   displaying a plurality of thumbnail images or the plurality of quick view images corresponding to the plurality of images.

17. A non-transitory computer-readable recording medium having embodied thereon a program for executing a method comprising:
   obtaining a captured image;
   generating a quick view image showing at least some regions of the captured image based on a user profile determined according to a type of the captured image, wherein the at least some regions of the captured image is determined based on the user profile reflecting tendency of a user viewing the quick view image; and
   displaying the generated quick view image according to a preset method,
   wherein the type of the captured image is determined based on at least one of number, position and activity of persons included in the captured image.

* * * * *